United States Patent Office 3,371,099
Patented Feb. 27, 1968

3,371,099
HYDROXYALKYL-SUBSTITUTED POLYALKYL-
ENEPOLYAMINO IMIDES OF POLYHALO-
POLYHYDROMETHANONAPHTHALENE DI-
CARBOXYLIC ACID
Edward M. Geiser, Downers Grove, Ill., assignor to Universal Oil Products Company, Des Plaines, Ill., a corporation of Delaware
No Drawing. Filed Oct. 21, 1964, Ser. No. 405,611
8 Claims. (Cl. 260—326)

ABSTRACT OF THE DISCLOSURE

Hydroxyalkyl-substituted polyalkylenepolyamino imides of polyhalopolyhydromethanonaphthalene dicarboxylic acid, exemplified by N-[3-(2-hydroxyethyl)-7-methyl-3,6-diazatridecyl] - 5,6,7,8,9,9 - hexachloro - 1,2,3,4,4a,5,8,8a - octahydro - 5,8 - methano - 2,3 - naphthalene dicarboxylic imide. The compounds are useful as flame retardants and anti-weathering agents for elastomers, plastics and resins.

This invention relates to novel compositions of matter comprising substituted polyalkylenepolyamino imides of halomethanonaphthalene dicarboxylic acids. More particularly, the invention is concerned with these novel compositions of matter and their use as additives for imparting certain desirable properties to polymeric compositions of matter.

In past years, the use of certain polymeric compositions of matter such as plastics, resins, synthetic fabrics, etc. has experienced a tremendous growth. In view of the fact that plastics or resins are replacing metals in certain places involving an excessive amount of heat and possible exposure to flame, it is necessary that these synthetic compounds possess the capability of being able to withstand the aforementioned effects of heat and/or flame. For example, in recent years plastics have been used in architectural paneling, electrical appliances and equipment, and in other places where the possibility of contact with open flame is present. These plastics must therefore possess the physical properties of being resistant to flame or retardant to the action of the flame thereon. In addition to the use of these compounds in positions susceptible to flames, plastics have also been used as acoustical sound deadeners in walls or ceilings, as bodies for airplanes, automobiles, boats, as seats and for many other uses too numerous to mention at this time. Other polymeric compositions of matter such as resins which are used for coating other materials have also been more widely used in recent times. When such resins are used for coating other materials, it is necessary that the resins do not discolor or stain during a period of time due to the action of ultraviolet light thereon. This also holds true in the field of plastics. If the plastic material is either white or contains some color, it is especially necessary that it be color fast, otherwise it will deteriorate by changing color or by turning yellowish brown during long periods of use.

In this respect it has now been discovered that certain novel compositions of matter of a type hereinafter set forth in greater detail, when combined with certain polymeric compositions such as resins, plastics, foams, etc., will impart the desirable physical properties of flame retardancy, weather and color stability to said polymers. In addition to the aforementioned uses, it is also contemplated within the scope of this invention that the compounds prepared according to the process of this invention may also be utilized to impart insecticidal and shrink proofing properties to certain materials, and specifically wool, although other naturally occurring fibrous materials such as cotton, linen, etc. may also be treated with these compounds to impart desirable and beneficial characteristics thereto.

It is, therefore, an object of this invention to provide novel compositions of matter comprising certain imides of halo-substituted methanonaphthalene dicarboxylic acids.

Another object of this invention is to provide novel compositions of matter which impart desirable physical properties to certain polymers, said properties being flame resistance, weather and color stability.

One embodiment of this invention is found in a hydroxyalkyl-substituted polyalkylenepolyamino imide of a polyhalopolyhydromethanonaphthalene dicarboxylic acid.

Another embodiment resides in a process for the treatment of polymeric materials which comprises admixing a polymeric material with a hydroxyalkyl-substituted polyalkylenepolyamino imide of a polyhalopolyhydromethanonaphthalene dicarboxylic acid at an elevated temperature, curing the resultant mixture at an elevated temperature, and recovering the treated polymeric material.

A specific embodiment of this invention is found in N-[3 - (2 - hydroxyethyl) - 7 - methyl-3,6-diazatridecyl]-5,6,7,8,9,9-hexachloro-1,2,3,4,4a,5,8,8a - octahydro - 5,8-methano-2,3-naphthalene dicarboxylic imide.

Another specific embodiment of this invention is found in a process for the treatment of epoxy resins which comprises mixing an epoxy resin with N-[3,6-bis-(2-hydroxyethyl) - 7 - methyl - 3,6 - diazatridecyl] - 5,6,7,8,9,9 - hexachloro-1,2,3,4,4a,5,8,8a-octahydro-5,8-methano-2,3-naphthalene dicarboxylic imide at a temperature in the range of from about 50° to about 150° C., curing the resultant mixture at a temperature in the range of from about 100° to about 150° C., and recovering the treated epoxy resin.

Other objects and embodiments will be found in the following further detailed description of this invention.

As hereinbefore set forth, the present invention relates to novel compositions of matter comprising hydroxyalkyl-substituted polyalkylenepolyamino imides of polyhalopolyhydromethanonaphthalene dicarboxylic acids and to the use thereof as additives for certain polymeric materials. The hydroxyalkyl-substituted polyalkylenepolyamino imides of polyhalopolyhydromethanonaphthalene dicarboxylic acids which are utilized in the present invention may be prepared in any suitable manner. Starting from the basic raw materials, the finished product may be prepared by a series of condensations. For example, a typical compound may be prepared by reacting a conjugated aliphatic diene with an olefinic dicarboxylic acid or anhydride thereof. Examples of conjugated aliphatic dienes which may be used include 1,3-butadiene, 2-methyl-1,3-pentadiene, 1,3-pentadiene, etc.; olefinic dicarboxylic acids or anhydrides which may be used include maleic acid, maleic anhydride, fumaric acid, etc. The Diels-Alder condensation will take place at an elevated temperature in the range of from about 80° to about 250° C. or more and at a pressure sufficient to maintain a major portion of the reactants in a liquid phase, said pressure being in a range of from about atmospheric up to about 100 atmospheres or more. The tetrahydrophthalic acid or anhydride thereof which results from the aforementioned condensation is then further condensed with a conjugated halocycloalkadiene to form the desired product, examples of said halo-substituted cycloalkadienes including tetrachlorocyclopentadiene, hexachlorocyclopentadiene, tetrabromocyclohexadiene, hexabromocyclopentadiene, etc. The second condensation reaction is also effected at elevated temperatures in a range of from about 50° to about 250° C. or more and at pressures ranging from atmospheric up to about 100 atmospheres or more, the pressure again being sufficient so as to maintain a major portion of the reactants in the liquid phase at the reaction temperature.

Examples of polyhalopolyhydromethanonapthalene dicarboxylic acids or anhydrides thereof which may be prepared include 5,6,7,8,9 - hexachloro - 1,2,3,4,4a,5,8,8a-octahydro-5,8 - methano - 2,3 - naphthalene dicarboxylic acid 5,6,7,8,9,9-hexachloro-1,2,3,4,4a,5,8,8a - octahydro-5,8 - methano-2,3 - naphthalene dicarboxylic anhydride, 5,6,7,8,9,9 - hexabromo - 1,2,3,4,4a,5,8,8a - octahydro 5,8-methano-2,3-naphthalene dicarboxylic acid 5,6,7,8,9,9-hexabromo-1,2,3,4,4a,5,8,8a-octahydro - 5,8 - methano-2,3-naphthalene dicarboxylic anhydride, etc.

The thus prepared polyhalopolyhydromethanonaphthalene dicarboxylic acid or anhydride thereof is then reacted with a polyalkylenepolyamino compound such as diethylenetriamine, dipropylenetriamine, dibutylenetriamine, dipentylenetriamine, dihexylenetriamine, diheptylenetriamine, dioctylenetriamine, etc., triethylenetetramine, tripropylenetetramine, tributylenetetramine, tripentylenetetramine, trihexylenetetramine, triheptylenetetramine, trioctylenetetramine, etc., tetraethylenepentamine, tetrapropylenepentamine, tetrapentylenepentamine, tetrahexylenepentamine, tetraheptylenepentamine, etc., pentaethylenehexamine, pentapropylenehexamine, pentabutylenehexamine, pentapentylenehexamine, etc. The condensation process between the acid or anhydride and the polyalkylenepolyamino compound is effected at condensation conditions which include elevated temperatures in the range of from about 50° to about 250° C. or more. The particular reaction temperature will be dependent upon the reactants undergoing condensation, as well as the solvent comprising a substantially inert organic compound such as aromatic hydrocarbons including benzene, toluene, xylene, ethylbenzene, etc.; aliphatic solvents including n-pentane, n-hexane, n-heptane, etc.; or cyclic paraffins including cyclopentane, cyclohexane, methylcyclopentane, etc., which are used. In addition, the reaction time during which the starting materials undergo condensation will be dependent to some extent upon the particular temperature which is employed, usually the reflux temperature of the solvent, and will usually range from one-half to about five hours or more.

Following the preparation of the polyalkylenepolyamino imide of the polyhalopolyhydromethanonaphthalene-dicarboxylic acid, the imide is then further condensed with a ketone. This condensation is also effected at temperatures ranging from room temperature (25° C.) up to about 200° C. or more and, if so desired, at pressures ranging from atmospheric up to about 50 atmospheres or more, the pressure which is used being sufficient to maintain a major portion of the reactants in a liquid phase. In addition, if so desired, this condensation is also effected in the presence of a substantially inert organic solvent of the type hereinbefore set forth in connection with the preparation of the imide. Examples of ketones which are condensed with the imide include acetone, methyl ethyl ketone, methyl propyl ketone, methyl butyl ketone, methyl pentyl ketone, methyl hexyl ketone, diethyl ketone, ethyl propyl ketone, ethyl butyl ketone, ethyl hexyl ketone, dipropyl ketone, etc.

The condensation product which is prepared according to the above paragraph is then reacted with an alkylene oxide to prepare the desired product. This reaction in which ethylene oxide or propylene oxide is condensed with the imide is effected at reaction conditions similar to those set forth in the above paragraph, that is, temperatures ranging from room temperature up to about 200° C. or more and pressures ranging from atmospheric up to about 50 atmospheres. The alkylene oxide is present in a mole ratio ranging from about 1:1 up to about 6:1 moles of alkylene oxide per mole of imide, the amount of oxide present being dependent upon the number of hydroxyalkyl substituents which are desired to be placed on the polyalkylenepolyamino side chain of the imide.

Examples of hydroxyalkyl-substituted polyalkylenepolyamino imides of a polyhalopolyhydromethanonaphthalene dicarboxylic acid which may be prepared according to the present invention possess the generic formula:

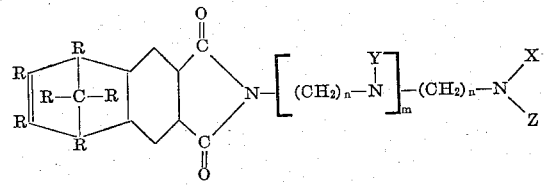

in which the R's are selected from the group consisting of hydrogen and halogen radicals, at least two R's being halogen; X and Z are selected from the group consisting of hydrogen, alkyl radicals containing from 1 to 8 carbon atoms and hydroxyalkyl radicals containing from 2 to 3 carbon atoms; Y is a hydroxyalkyl radical containing from 2 to 3 carbon atoms; $n$ is an integer of from 1 to 3; and $m$ is an integer of from 1 to 4. Specific examples of these compounds include N-[3-(2-hydroxyethyl)-7-methyl-3,6-diazatridecyl]-5,6,7,8,9,9-hexachloro-1,2,3,4,4a-5,8,8a-octahydro-5,8-methano-2,3-naphthalene dicarboxylic imide, N-[3,6-bis-(2-hydroxyethyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[4,8-bis-(2-hydroxyethyl)-9-methyl-4,8-diazaundecyl]-5,6,7,8,9,9-hexachloro-1,2,3,4,4a,5,8,8a-octahydro-5,8-methano-2,3-naphthalene dicarboxylic imide, N-[3,6,6-tris-(2-hydroxyethyl)-3,6-diazahexyl]-5,6,7,8,9,9-hexachloro-1,2,3,4,4a,5,8,8a-octahydro-5,8-methano-2,3-naphthalene dicarboxylic imide, N-[4,8-bis-(2-hydroxyethyl)-9-methyl-4,8-diazadodecyl]-5,6,7,8,9,9-hexabromo-1,2,3,4,4a,5,8,8a-octahydro-5,8-methano-2,3-naphthalene dicarboxylic imide, N-[3-(3-hydroxypropyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[3,6-bis-(3-hydroxypropyl)-7-methyl-3,6-diazatridecyl]-5,6,7,8,9,9-hexachloro-1,2,3,4,4a,5,8,8a-octahydro-5,8-methano-2,3-naphthalene dicarboxylic imide, N-[4,8-bis-(3-hydroxypropyl)-9-methyl-4,8-diazaundecyl]-5,6,7,8,9,9-hexachloro-1,2,3,4,4a,5,8,8a-octahydro-5,8-methano-2,3-naphthalene dicarboxylic imide, N-[3,6,6-tris-(3-hydroxypropyl)-3,6-diazahexyl]-5,6,7,8,9,9-hexachloro-1,2,3,4,4a,5,8,8a-octahydro-5,8-methano-2,3-naphthalene dicarboxylic imide, N-[4,8-bis-(3-hydroxypropyl)-9-methyl-4,8-diazadodecyl]-5,6,7,8,9,9-hexabromo-1,2,3,4,4a,5,8,8a-octahydro-5,8-methano-2,3-naphthalene dicarboxylic imide, etc.

It is to be understood that the aforementioned compounds are only representative of the novel compositions of matter which may be prepared and that the present invention is not necessarily limited thereto.

The aforementioned novel compositions of matter may be prepared in any suitable manner and may comprise either a batch or continuous type operation. For example, when utilizing a batch type operation and starting with the basic materials, the conjugated alkadiene and olefinic dicarboxylic acid are placed in an appropriate condensation apparatus which is thereafter heated to a temperature ranging from about 80° to about 250° C., while the pressures utilized will be in a range of from atmospheric up to about 100 atmospheres, said pressure being sufficient to maintain a major portion of the reactants in the liquid phase. At the end of the desired reaction time the tetrahydrophthalic acid, anhydride or homolog thereof which results from the aforementioned condensation is further condensed with a halo substituted cycloalkadiene at elevated temperatures ranging from about 50° to about 250° C. in a second condensation vessel. If so desired, the two condensations may be effected in the presence of an organic solvent such as benzene, toluene, xylene, n-pentane, n-hexane, cyclopentane, etc. The third step in the preparation of the finished compound is effected by placing a polyalkylenepolyamino compound in a condensation vessel along with a substantially inert organic solvent. The compound resulting from the aforementioned condensation, namely, a polyhalopolyhydromethanonaphthalene dicarboxylic acid, is slowly added thereto, the reaction usually being exothermic. To control this exothermicity, the amino compound may be cooled prior to the addition of acid or anhydride and the rise in temperature controlled by utilization of any external cooling means such as ice baths. Upon completion of the addition of the acid or anhydride, the reaction mixture is heated to the reflux temperature of the solvent, if one is used, or to a predetermined reaction temperature which may be in the range of from about 100° up to about 250° C. or more. The reaction vessel which is utilized is provided with means for removing the water which is formed during the reaction. Upon completion of the desired residence time, which may range from about one-half up to about twelve hours or more, being evidenced by the removal of the theoretical amount of water, the reaction mixture is allowed to cool to room temperature. Following this, the desired imide is recovered from the solvent and excess amino compound by conventional means such as fractional distillation. In this respect it should be noted that the amino compound is usually present in the original reaction mixture in a ratio of from about 1:1 to 10:1 moles of amino compound per mole of acid or anhydride. The imide is then placed in yet another condensation apparatus and an aliphatic ketone of the type hereinbefore set forth is added thereto. As hereinbefore set forth, this condensation may also be effected in the presence of an organic solvent. Following this, the reaction mixture is heated to a temperature ranging from about room temperature up to about 200° C. or more. The resulting condensation product, after cooling of the reaction vessel, is recovered by fractional distillation and thereafter further condensed in a fifth condensation vessel with ethylene oxide or propylene oxide at reaction conditions similar to those set forth in the above step. At the end of the predetermined residence time, the vessel and contents thereof are cooled to room temperature and the desired hydroxyalkyl-substituted polyalkylenepolyamino imide of a polyhalopolyhydromethanonaphthalene dicarboxylic acid is separated from the solvent and any unreacted starting materials by conventional means such as fractional distillation.

It is also contemplated that the novel products of the present invention may also be prepared in a continuous manner. When such type of operation is used, a quantity of the starting materials comprising the conjugated aliphatic diene such as 1,3-butadiene and the olefinic dicarboxylic acid such as maleic acid are continuously charged to a reaction vessel which is maintained at the proper operating conditions of temperature and pressure. These starting materials may be charged through separate lines or, if so desired, may be mixed with an organic solvent prior to entering into said reactor and charged thereto in a single stream. Upon completion of the desired reaction time, the condensation product is continuously withdrawn from the reactor and separated from unreacted materials, the latter being recycled to form a portion of the feed stock, while the former comprising a tetrahydrophthalic acid, anhydride or homolog thereof is charged to a second reactor. This second reactor is also maintained at the proper operating conditions of temperature and pressure and will contain a substantially inert organic solvent. The halo-substituted cycloalkadiene such as hexachlorocyclopentadiene is also continuously charged to the second reactor. Upon completion of the desired residence time therein, the polyhalopolyhydromethanonaphthalene dicarboxylic acid or anhydride thereof is continuously withdrawn and subjected to separation treatment similar to that which takes place after withdrawal of the condensation product from the first reactor; that is, it is separated from unreacted starting materials which are recycled back to the second reactor. The acid or anhydride thereof is then continuously charged to a third reactor which, as in the case of all reaction zones of the continuous process, is maintained at the proper operating conditions of temperature and pressure. In addition, an excess of polyalkylenepolyamino compound along with a substantially inert organic solvent is also continuously charged to the third reactor zone through a separate line. The reactor effluent is continuously removed from this third reaction zone and the unreacted starting materials are separated therefrom, after which the remainder of the effluent is subjected to further treatment to remove the organic solvent and water which has formed during the reaction. The desired imide is then charged to a fourth reaction zone along with an aliphatic ketone wherein the imide undergoes condensation with the ketone. As in the case of the previous reaction zones, the reactor effluent is also continuously withdrawn and subjected to a separation treatment wherein the unreacted starting materials and solvent, if one is used, are removed and recycled, while the condensation product is continuously charged to a fifth reaction zone. In this reaction zone the imide undergoes reaction with ethylene oxide or propylene oxide, the amount of the oxide present being determined by the number of hydroxy-alkyl radicals which are desired to be substituted on the side chain of the imide. The desired hydroxyalkyl-substituted polyalkylenepolyamino imide of a polyhalopolyhydromethanonaphthalene dicarboxylic acid is separated from the reactor effluent by conventional means and recovered.

As hereinbefore set forth, the novel composition of matter comprising the hydroxyalkyl-substituted polyalkylenepolyamino imide of a polyhalopolyhydromethanonaphthalene dicarboxylic acid may be utilized as a component of a plastic or resin to impart certain desirable characteristics or properties thereto. A specific example of this would be the use of the imide as an additive for resinous materials. Particularly speaking, the products of this invention may be used as additives with epoxy resins whereby the final product will possess advantageous physical properties, among which are a high degree of flame retardancy and improved weather stability, as well as improved light or color stability. The epoxy resins in an uncured stage are usually thermoplastic and may range from low viscosity liquids to high melting point, brittle solids. One example of an epoxy resin which may be cured by the addition of the imides of the present invention is the condensation product of epichlorohydrin and bisphenol-A. The resins may be cured by admixing a hydroxy-alkyl-substituted imide of the type hereinbefore set forth with the resin and thereafter curing the mixture by treatment at an elevated temperature for a predetermined period of time. The resultant product will have the physical characteristics thereof altered to their desirable value and thus may be utilized for various purposes such as floor surfacing, coatings, etc.

It is also contemplated within the scope of this invention that the hydroxyalkyl-substituted polyalkylenepolyamino imides of polyhalopolyhydromethanonaphthalene dicarboxylic acids may also be utilized as components of other polymeric compositions of matter in which said imides are condensed with reactive polyfunctional organic intermediates or mixtures of intermediates. For example, the imide may be admixed with certain intermediates to prepare polyurethane foams which will possess an increased resistance to flame as well as an excellent color stability, said polyurethane foams being prepared in either a rigid or flexible state, depending upon the particular use to which the end product will be directed. In addition, the imides may also be reacted with certain polyfunctional organic intermediates to prepare polyester resins which are thereafter utilized in the preparation of construction materials or as plasticizers for polyvinyl compounds. Furthermore, they are also useful in the preparation of alkyd resins which are used as intermediates in paints, varnishes, etc.

As hereinbefore set forth, all of the finished elastomers, plastics and resins will have an excellent color stability, weather stability and flame retardancy. In all of the aforementioned polymeric compositions of matter, the hydroxyalkyl-substituted polyalkylenepolyamino imide of a polyhalopolyhydromethanonaphthalene dicarboxylic acid will usually be present in the finished product in various concentrations ranging from about 5% up to about 50% or more by weight of the finished product.

The following examples are given to illustrate the process of the present invention which, however, are not intended to limit the generally broad scope of the present invention in strict accordance herewith.

EXAMPLE I

A glass liner containing a mixture of 0.5 mole of maleic acid and an organic solvent comprising toluene is sealed into an autoclave and about 1 mole of 1,3-butadiene is pressured in. The autoclave and contents thereof are heated to a temperature of about 175° C. and maintained at this temperature for a period of about 3 hours, at the end of which time the autoclave and contents thereof are cooled to room temperature. The desired product is separated by extracting the reaction product with dilute alkali, followed by acidification and fractional crystallization. The fraction comprising 1,2,3,6-tetrahydrophthalic acid is separated, placed in a flask and mixed with a molecular proportion of hexachlorocyclopentadiene and xylene solvent. The mixture is heated to a temperature of about 150° C. and maintained thereat for an additional period of about 2 hours. At the end of this time the flask and contents thereof are then allowed to cool to room temperature, and the product is subjected to fractional crystallization. The desired product, comprising 5,6,7,8,9,9-hexachloro-1,2,3,4,4a,5,8,8a-octahydro-5,8-methano-2,3-naphthalene dicarboxylic acid is separated and recovered.

Following this, about 2.5 moles of diethylenetriamine is placed in a reaction vessel provided with a water trap. There is gradually added thereto about 0.5 mole of the acid prepared according to the above paragraph during a period of about 1 hour. Benzene is then added; the reaction mixture is heated and maintained at reflux temperature (about 85% C.) for a period of about 1.5 hours during which time the water which forms is removed. The benzene is then removed by distillation in a steam bath and the excess diethylenetriamine is removed by distillation under high vacuum. The resultant product, which is solid, is ground to a fine product, washed with water, dissolved in methyl alcohol and dried using anhydrous sodium sulfate. The mixure is then filtered and the methyl alcohol is evaporated to yield the desired product comprising the diethylenediamino imide of 5,6,7,8,9,9-hexachloro-1,2,3,4,4a,5,8,8a-octahydro-5,8-methano-2,3-naphthalene dicarboxylic acid.

The imide prepared according to the above paragraph is then placed in a condensation flask provided with heating and refluxing means. A molecular proportion of methyl hexyl ketone along with a substantial amount of benzene is added thereto. The resultant solution is then heated and refluxed at a temperature of about 85° C. for a period of about 3 hours. At the end of this time the solvent is removed by distillation in a steam bath; the product is washed with water and dried again using anhydrous sodium sulfate to yield the N-(7-methyl-3,6-diazatridecyl) imide of 5,6,7,8,9,9-hexachloro-1,2,3,4,4a,5,8,8a - octahydro-5,8-methano-2,3-naphthalene dicarboxylic acid.

The imide which is prepared according to the above paragraph and ethylene oxide in equimolecular proportions along with benzene are placed in a condensation flask and the resultant solution is refluxed for a period of about 2 hours. A the end of this time the flask and contents thereof are allowed to cool to room temperature, and the benzene is removed by distillation in a steam bath. The product is then washed with water, dissolved in alcohol and dried. Upon removal of the alcohol by evaporation, the desired product comprising N-[3-(2-hydroxyethyl) - 7 - methyl-3,6-diazatridecyl]-5,6,7,8,9,9-hexachloro - 1,2,3,4,4a,5,8,8a - octahydro-5,8-methano-2,3-naphthalene dicarboxylic imide is recovered.

The hydroxyethyl-substituted imide prepared according to the above is utilized as a curing agent for a liquid epoxy resin having an epoxide equivalent weight of 190 and known in the trade as "Epon 828." A mixture of the imide and the epoxy resin is warmed on a steam bath. After several minutes the mixture will become homogenous and is poured into molds which have been prepared from glass sheets and Teflon spacers. In addition, a mold release agent is also used to facilitate removal. The molds are placed in an air circulating oven and the curing of the resin will be effected by maintaining the molds at a temperature of about 100° C. for a period of about 6 hours. The epoxy resin which has been cured by the addition of the imide will be found to be self-extinguishing when removed from the direct action of the flame. In addition, the resin will also possess a good color stability when placed in direct sunlight for an extended period of time.

EXAMPLE II

In this example the N-(7-methyl-3,6-diazatridecyl)-5,6,7,8,9,9 - hexachloro - 1,2,3,4,4a,5,8,8a - octahydro-5,8-methano-2,3-naphthalene dicarboxylic imide is prepared in a manner set forth in the above example. Following the preparation of the imide, one molecular proportion of said imide and two molecular proportions of ethylene oxide along with xylene are placed in a condensation apparatus. The apparatus is heated to a temperature of about 150° C. and maintained at the reflux temperature for a period of about 3 hours. At the end of this time the reaction product is recovered, the solvent is removed by distillation and the product is washed with water. After several washes with water, the product is dissolved in alcohol and dried using anhydrous sodium sulfate. The alcohol is evaporated and the desired product comprising N-[3,6-bis-(2-hydroxyethyl)-7-methyl - 3,6-diazatridecyl] - 5,6,7,8,9,9-hexachloro-1,2,3,4,4a,5,8,8a-octahydro - 5,8 - methano-2,3-naphthalene dicarboxylic imide is recovered.

The product prepared according to the above paragraph is used to cure an epoxy resin in a manner similar to that set forth in Example I above, that is, by admixing said imide with an epoxy resin known as "Epon 828" and heating the mixture. The solution is then poured into molds similar in nature to those hereinbefore set forth and cured in an air circulated oven at a temperature of about 100° C. for a period of 6 hours. The recovered treated resin will have excellent heat distortion and hardness properties, as well as being self-extinguishing when removed from the direct action of a flame, and will possess excellent color stable properties.

EXAMPLE III

In this example the desired imide is prepared in a manner similar to that set forth in Example I above by condensing 5,6,7,8,9,9 - hexachloro-1,2,3,4,4a,5,8,8a-octahydro-5,8-methano-2,3-naphthalene dicarboxylic acid with an excess of dipropylenetriamine. Upon completion of the condensation, the excess dipropylenetriamine, water and solvent are removed and the resultant N-dipropylenediamino imide of 5,6,7,8,9,9-hexachloro-1,2,3,4,4a,5,8,8a-octahydro-5,8-methano-2,3-naphthalene dicarboxylic acid is recovered. This imide is then condensed with a molecular proportion of methyl ethyl ketone in a manner similar to that hereinbefore set forth and the resulting adduct is condensed with ethylene oxide in equimolecular proportions. After treatment of the reaction product in a manner hereinbefore set forth, the resultant product comprising N-[4,8-bis(2-hydroxyethyl)-9-methyl-4,8-diazaundecyl] - 5,6,7.8,9,9 - hexachloro - 1,2,3,4,4a,5,8,8a - octahydro-5,8-methano-2,3-naphthalene dicarboxylic imide is separated and recovered.

This product is admixed with an uncured epoxy resin of the type hereinbefore set forth in Example I above and, after heating to dissolve the imide, the mixture is poured into molds. The treated resin is cured by heating to 100° C. for a period of 6 hours in an air circulating oven. Upon recovery of the treated resin, it will be found to possess heat distortion, hardness, flame retardancy and color stable properties similar to those resins described in Examples I and II above.

EXAMPLE IV

In this example the imide comprising N-(7-methyl-3,6-diazatridecyl) - 5,6,7,8,9,9 - hexachloro - 1,2,3,4,4a,5,8, 8a - octahydro-5,8-methano-2,3-naphthalene dicarboxylic imide is prepared according to the method set forth in Example I above. One molecular proportion of this imide and three molecular proportions of ethylene oxide are refluxed in benzene at a temperature of about 85° C. for a period of 3 hours. At the end of this time the solvent is then evaporated and the product treated by washing with water dissolution in methyl alcohol and drying. The alcohol is then evaporated and the desired product comprising N-[3,6,6-tris-(2-hydroxyethyl) - 3,6 - diazahexyl]- 5,6,7,8,9,9 - hexachloro - 1,2,3,4,4a,5,8,8a - octahydro-5, 8-methano-2,3-naphthalene dicarboxylic imide is recovered.

An epoxy resin known in the trade as "Epon 828" and the imide prepared according to the above paragraph are warmed on a steam bath. When the mixture becomes homogenous, it is poured into molds similar in nature to those described in Example I above. The mixture is placed in an air circulating oven at a temperature of about 100° C. for a period of 6 hours. At the end of this time the sheets of resin which have been cured are cut into strips and subjected to physical property evaluations. The physical properties of this resin are similar in nature to those found in the above examples as to heat distortion and hardness; in addition, the strip of resin is self-extinguishing when removed from the direct action of a flame.

EXAMPLE V

In this example 1,2,3,6-tetrahydrophthalic acid is prepared by placing 0.5 mole of maleic acid and toluene in a glass liner of a rotating autoclave, which is thereafter sealed into the autoclave. About one mole of 1,3-butadiene is pressured into the autoclave which is thereafter heated to a temperature of about 185° C. The autoclave and contents thereof are maintained at this temperature for a period of about 3 hours, following which the autoclave is allowed to cool to room temperature. The desired product is recovered by extracting the reaction product with dilute alkali followed by acidification and fractional distillation.

Following this, the acid is mixed with a molecular proportion of hexabromocyclopentadiene and xylene solvent. The mixture is heated to reflux (about 150° C.) and maintained thereat for an additional period of 2 hours. At the end of this time the flask and contents thereof are allowed to cool to room temperature and the product subjected to fractional crystallization. The desired reaction product comprising 5,6,7,8,9,9-hexabromo-1,2,3,4,4a,5,8,8a - octahydro - 5,8 - methano - 2,3 - naphthalene dicarboxylic acid is separated and recovered. The acid prepared in this manner is then condensed with dipropylenetriamine in a manner similar to that set forth above and the desired product comprising the dipropylenediamino imide of 5,6,7,8,9,9-hexabromo-1,2,3,4,4a,5, 8,8a-octahydro-5,8-methano-2,3-naphthalene dicarboxylic acid is recovered. This imide is then further condensed with methyl propyl ketone in a manner described in Example I above and the desired N-(9-methyl-4,8-diazadodecyl) - 5,6,7,8,9,9 - hexabromo - 1,2,3,4,4a,5,8,8a - octahydro-5,8-methano-2,3-naphthalene dicarboxylic imide is recovered. A molecular proportion of this imide is treated with two molecular proportions of ethylene oxide and a benzene solvent in a manner similar to that set forth in Example I above. After treatment of the reaction product by washing, drying and evaporation of the solvent, the desired product comprising N-[4,8-bis-(2-hydroxyethyl) - 9 - methyl - 4,8 - diazadodecyl] - 5,6,7,8, 9,9 - hexabromo - 1,2,3,4,4a,5,8,8a - octahydro-5,8-methano-2,3-naphthalene dicarboxylic imide is recovered.

The imide prepared according to the above paragraph is used to treat an epoxy resin known in the trade as "Epon 828." The mixture of the imide and resin, after warming, will become homogeneous and is poured into molds made of glass using Teflon spacers. The mixture is cured in an air circulating oven at a temperature of 100° C. for a period of 6 hours. The cured sheets are removed and subjected to physical property evaluation. It is found that the physical properties of the resin are similar in nature as regards heat distortion, hardness, flame retardancy and color stability when compared to the treated resins of Examples I to IV above.

I claim as my invention:

1. A hydroxyalkyl-substituted polyalkylenepolyamino imide of a polyhalopolyhydromethanonaphthalene dicarboxylic acid having the formula:

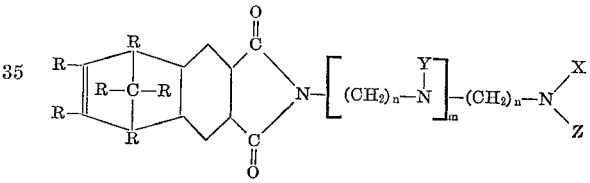

wherein the R's are hydrogen, chlorine or bromine, at least two R's being chlorine or bromine; X and Z are selected from the group consisting of hydrogen, alkyl having from 1 to 8 carbon atoms, and hydroxyalkyl having 2 or 3 carbon atoms; Y is hydroxyalkyl having 2 or 3 carbon atoms; $n$ is an integer of from 2 to 3; and $m$ is an integer of from 1 to 4.

2. N-[3-(2-hydroxyethyl) - 7 - methyl - 3,6 - diazatridecyl] - 5,6,7,8,9,9 - hexachloro - 1,2,3,4,4a,5,8,8a - octahydro-5,8-methano-2,3-naphthalene dicarboxylic imide.

3. N - [3,6-bis-(2-hydroxyethyl)-7-methyl-3,6-diazatridecyl] - 5,6,7,8,9,9 - hexachloro - 1,2,3,4,4a,5,8,8a - octahydro-5,8-methano-2,3-naphthalene dicarboxylic imide.

4. N - [4,8-bis-(2-hydroxyethyl)-9-methyl-4,8-diazaundecyl] - 5,6,7,8,9,9 - hexachloro - 1,2,3,4,4a,5,8,8a - octahydro-5,8-methano-2,3-naphthalene dicarboxylic imide.

5. N-[3,6,6-tris-(2 - hydroxyethyl) - 3,6 - diazahexyl]-5,6,7,8,9,9 - hexachloro - 1,2,3,4,4a,5,8,8a - octahydro-5, 8-methano-2,3-naphthalene dicarboxylic imide.

6. N - [4,8-bis-(2-hydroxyethyl)-9-methyl-4,8-diazadodecyl] - 5,6,7,8,9,9 - hexabromo - 1,2,3,4,4a,5,8,8a - octahydro-5,8-methano-2,3-naphthalene dicarboxylic imide.

7. The compound of claim 1 wherein each R is chlorine.

8. The compound of claim 1 wherein each R is bromine.

References Cited

UNITED STATES PATENTS

| 1,915,334 | 6/1933 | Salzberg et al. | 260—243 |
| 2,075,359 | 3/1937 | Salzberg et al. | 167—22 |
| 3,299,094 | 1/1967 | Weil | 260—326 |
| 3,280,143 | 10/1966 | Hayes | 260—326 |

ALEX MAZEL, *Primary Examiner.*

J. TOVAR, *Assistant Examiner.*